U nited States Patent [19]
Caprari

[11] 3,860,335
[45] Jan. 14, 1975

[54] OPTICAL SYSTEM
[75] Inventor: Fausto Caprari, Jersey City, N.J.
[73] Assignee: RCA Corporation, New York, N.Y.
[22] Filed: Apr. 26, 1973
[21] Appl. No.: 354,644

[52] U.S. Cl. .............................................. 353/102
[51] Int. Cl. ...................... G03b 21/14, G03b 21/20
[58] Field of Search ........ 353/98, 99, 102, 122, 100

[56] References Cited
UNITED STATES PATENTS
1,908,043  5/1933  Morsbach ........................... 353/102
3,222,981  12/1965  Lucas .................................... 353/38

Primary Examiner—Richard E. Aegerter
Assistant Examiner—A. J. Mirabito
Attorney, Agent, or Firm—H. Christoffersen; A. I. Spechler

[57] ABSTRACT

An optical system for projecting a uniform field of light to expose a light-sensitive surface through a transparency in proximity to, or in contact with, the light-sensitive surface comprises a light source, a condenser consisting of two plano-convex quartz lenses, and a field lens consisting of a single plano-convex quartz lens, all disposed serially along an optical axis. The condenser and the field lens are disposed so as to image a light image plane beyond the field lens onto a curved surface, herein called a light object curved surface between the light source and the condenser. Every point in the light object curved surface is focused on the transparency which is in the light image plane, and vice versa.

3 Claims, 1 Drawing Figure

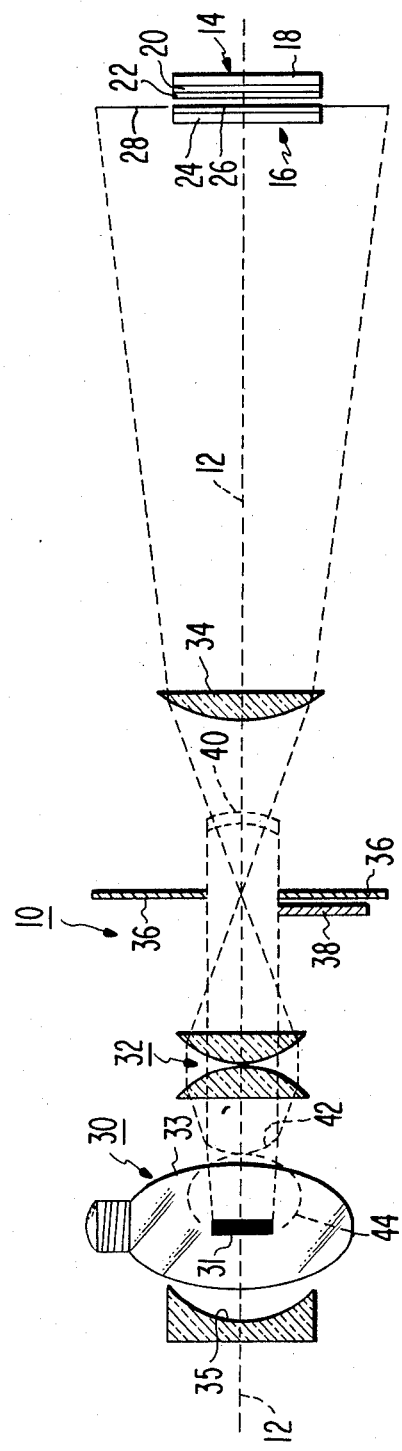

OPTICAL SYSTEM

This invention relates generally to optical systems, and more particularly to a depth of field projection printer for providing a uniform field of light for making contact or proximity prints. The novel optical system is particularly useful in semiconductor device fabrication for exposing planar photoresist or photographic emulsion surfaces with light directed through photomasks that are either in contact with, or in proximity to, the liht-sensitive surfaces.

It has been proposed, with conventional prior-art projection printers, to project an image of a transparency in an object plane, located between a condenser and a projection lens, onto an image plane to expose a light-sensitive material thereat. Since the transparency is a planar sheet or plate, the projection lens in prior-art projection printers, as in a slide projector, for example, was usually a highly corrected, multi-element lens to project the image of the transparency in focus on an image plane. Usually each element of the prior-art corrected projection lens was of a different glass material with a different index of refraction so as to focus an image on a planar surface. Such highly corrected projection lenses were relatively expensive and provided a relatively low radiant energy output because of the multiplicity of different elements used. In light projectors that used highly collimated light sources, excessive diffraction and poor uniformity of the light field often resulted, leaving something to be desired when such light projectors were used to reproduce a photomask master on a photoresist.

The novel optical system overcomes the aforementioned disadvantages of prior-art projection printers in that it comprises only three, uncorrected, relatively inexpensive, plano-convex lenses, all of which may be of the same material and index of refraction. Hence, the novel optical system can transmit light of a desired frequency more efficiently than lenses of different materials with different indices of refraction.

Briefly stated, the novel optical system comprises a light source, a condenser, and a field lens disposed serially along an optical axis. A light image plane beyond the field lens is imaged by the combination of both the condenser and field lenses as a ligh object curved surface between the light source and the condenser so that each point in the light image plane is focused in the light object curved surface, and vice versa.

In a preferred embodiment of the novel optical system, the condenser consists of two plano-convex lenses and the field lens consists of a single plano-convex lens. The lenses are preferably of quartz so as to provide a maximum transmission of ultra-violet light when a mercury arc lamp is used as the light source.

The single FIGURE of the drawing is a schematic representation of a preferred embodiment of the novel optical system for exposing a light-sensitive surface with an image of a transparency either in contact with, or in proximity to, the transparency.

Referring now to the drawing, the novel optical system 10 is shown schematically with its components disposed along an optical axis 12 for exposing a light-sensitive element 14 with light projected through a transparency 16. The light-sensitive element 14, in the photomask reproduction art as used in semiconductor devices fabrication, comprises a glass plate 18, a chromium layer 20 on the glass plate 18, and a layer 22 of a photoresist on the chromium layer 20. It is also within the contemplation of the present invention for the light-sensitive element to comprise a photoresist on a silicon layer, wherein the photoresist is to be exposed and etched to provide windows for treating the silicon layer, in a manner well known in the semiconductor art.

The transparency 16 comprises a photomask incluidng a glass plate 24 with a layer 26 of a material defining an image, such as a chromium pattern, for example, to be reproduced. The photoresist layer 22 of the light-sensitive element 14 is in contact with, or in close proximity to, the patterned layer 26 of the transparency 16, the layer 26 being in the light image plane 28 of the optical system 10. In the optical system 10, the light-sensitive element 14 must be positioned within the depth of focus of the system and parallel to the transparency 16.

A light source 30, illustrated as a mercury arc lamp, comprises, when suitably energized, a mercury arc 31 contained within a quartz cylinder about 2.00 inches (5.08 cm) high and 0.50 inch (1.27 cm) in diameter and a nitrogen-filled, borosilicate enveolop 33. These specifications are for a mercury arc lamp, type Sylvania H39-22KB, 175W, commonly used for street illumination purposes. It is within the contemplation of the novel optical system 10, however, to use other light sources, as, for example, a bank of green fluorescent lamps when a silver halide type photographic emulsion is to be exposed, or a helical xenon flash tube when certain photoresists are to be exposed at relatively high speeds. The mercury arc 31 is disposed transversely to the optical axis 12. Preferably, the mercury arc 31 should be perpendicular to, and bisected by, the optical axis 12.

A concave mirror 35 is disposed on the optical axis 12 and behind the light source 30 to reflect light along the optical axis 12, thereby increasing the efficiency of the light source 30.

A condenser 32 and a field lens 34, which may comprise positive convex lenses, are disposed serially along the optical axis 12. The condenser 32 preferably comprises two plano-convex lenses that are also preferably of quartz with their convex surfaces facing, and slightly separated from, each other, as shown. The field lens 34 is preferably a single plano-convex lens that is also preferably of quartz, the convex surface facing the condenser 32. The effective focal lengths of the condenser 32 and the field lens, for example, are 2.5 in. (6.3 cm) and 10 in. (25.4 cm), respectively. An aperture stop 36 is disposed between the condenser 32 and the field lens 34. A shutter 38 is disposed parallel to the plane of the aperture stop 36 and is adapted to move across the aperture stop 36, in a manner well known in the camera and the projection printing arts. The shutter 38 may be disposed in other portions along the optical axis 12 than the position illustrated, in a manner well known in the art.

The condenser 32 is disposed to project an image 40 of the mercury arc 31 into the entrance pupil of the field lens 34, and to provide the optical system 10 with a linear magnification of about 4.5x, for example. Since the lenses of the condenser 32 are uncorrected, the real image 40 of the mercury arc 31 does not project in a plane, but is rather in focus on a curved surface.

In the embodiment illustrated, the condenser 32 and the field lens 34, together with the aperture stop 36 are equivalent to a three element projection lens, 11 inches (27.9 cm) in length and 5 inches (12.7 cm) in diameter, with an effective focal length of 4.2 inches (9.7 cm) and an $f$ no. of 2.1.

The light image plane 28, in which the transparency 16 is disposed, can be considered as the projection of a light object curved surface 42, located between the lamp 30 and the condenser 32, and vice versa. The light object curved surface 42 is a portion of an ellipsoid, having the curvature indicated in the drawing (the intersection of a plane with the ellipsoid surface). Actually, the light object curved surface 42 is the image of the light image plane 28 projected through the projection lens comprising both the field lens 34 and the condenser 32. Also, every point in the light object curved surface 42 is projected by both the condenser 32 and the field lens 34 and focused on the light image plane 28, and vice versa. In other words, if a transparency could be placed on the light object curved surface 42, it would be projected onto the light image plane 28. The depth of focus and the resolution of the light image plane 28 are functions of the aperture stop 36, the effective focal length of the combination of the condenser 32 and the field lens 34, which are, in fact, to be considered as a projection lens, and the wavelength of the light from the light source 30. The resolution of the illustrated optical sytstem 10 is about one micrometer.

The position of the light image plane 28 determines the position of the light object curved surface 42. In other words, every point in the light object curved surface 42, which is actually a portion of the surface of an ellipsoid, is in focus as a magnified point on the light image plane 28. In the optical system 10 illustrated herein, the condenser 32 and the field lens 34 are disposed so that the light object curved surface 42 is projected and magnified by the combination of both the condenser 32 and the field lens 34 to provide a light image plane having a magnification of about 4.5x. Under these conditions, the depth of field of the light object curved surface 42 is equal to the depth of focus of the light image plane 28 divided by the square of the magnification. Thus, for many photomask applications, for example, wherein the depth of focus can be as high as 1 mil (0.0025 cm), the depth of field of the light object curved surface 42 of the embodiment of the optical system 10 shown in the illustration is about 50 microinches (0.00013 cm).

An important advantage of the optical system 10 is provided by the fact that this very shallow depth of field of the light object curved surface 42 is magnified as much as twenty times in the light image plane 28. Under these conditions, a uniform, slightly divergent, and low scattered light distribution exists throughout the depth of focus of the light image plane 28, while a diffused light condition exists outside of the depth of focus region. As a consequence of these conditions, it is apparent that the novel optical system 10 performs similarly to a prior-art collimated light system only in the depth of focus region of the light image plane 28, a diffused light condition existing in the rest of the optical path. These characteristics make the novel optical system 10 less affected by diffraction and visual defects than prior art, conventional, collimated optical systems.

The mercury arc 31 of the light source 30 exhibits a candlepower distribution curve 44 that has a curvature opposite to that of the light object curved surface 42. As used herein, "a candlepower distribution curve" is defined as a graphic record of the intensity of light emitted at various angles from a luminous source. The greater the distance of a point on the curve from the mercury arc 31 the greater is the intensity of light along the line defined by that point and the center of the mercury arc 31. The brightest point of light from the mercury arc 31 is on the optical axis 12 under these conditions, resulting in a symmetrical distribution of light from the light source 30, and consequently, a good uniformity of illumination. In order to get the maximum brightness and efficiency, as well as uniformity of light at the light image plane 28, the light impage plane 28 is disposed so that the light object curved surface 42 is always between the condenser 32 and the light source 30, and preferably spaced about a quarter of an inch (0.635 cm) from the envelope 33 of the light source 30. If a portion of the light object curved surface 42 intersects either the envelope 33 or a portion of the condenser 32, imperfections in the intersected materials project onto the light image plane 28. Hence, such positioning of the light object plane 28 is to be avoided.

The mercury arc 31 produces light having a wavelength in the neighborhood of 365 nanometers. Hence, the condenser 32 and the field lens 34 should be made of quartz to transmit this light with the greatest efficiency. The light transmission of the projection lens which comprises the three quartz plano-convex lenses of the optical system 10 is about 90 percent.

In making a print of the transparency 16 on the light-sensitive element 14, the light sensitive element 14 is exposed to light from the mercury arc 31 for a period of time determined by the type of photoresist layer 22 used. The light-sensitive element 14 is then developed, and the chromium layer 20 is etched through the developed photoresist 22 by photolithographic means well known in the art. After etching, the developed photoresist 22 is removed, leaving a print of the transparency 16 on the light-sensitive element 14.

Thus, there has been described a depth of field projection printer that employs only three, plano-convex, uncorrected lenses that may be of a material having the same index of refraction to provide a maximum of light transmission for a particular wavelength of light. This is important for exposing certain photoresists and light-sensitive emulsions that are, or must be treated to be, responsive only to light in relatively narrow spectral bands. The resolution of the optical system 10 has been determined as being one-eighth of the depth of focus of the light image plane of the system. By way of contrast, the resolution of prior-art, highly collimated, optical projection systems is only about one-third of the spacing between the transparency and the light-sensitive element when the latter are positioned similar to the transparency 16 and the light-sensitive element 14 of the optical system 10.

The values and dimensions given for the optical system 10 described herein are merely for illustrative purposes and are not to be construed in a limiting sense.

What is claimed is:

1. An optical system comprising:
   a light source, a condenser, and a field lens disposed serially along an optical axis, s
   said condenser and said field lens being disposed so as to provide a light object curved surface between said light source and said condenser when a light image plane is disposed beyond said field lens, the combination of both said condenser lens and said field lens comprising a projection lens disposed so that every point in said light image plane is focused on said light object curved surface, and vice versa, said light object curved surface being a portion of an ellipsoid, said light source, when energized, having a candle-power distribution curve that indicates the greatest intensity of light from said light source is on said optical axis, and the curvatures of said candlepower distribution curve and said light object curved surface being substantially opposite to each other.

2. An optical system comprising:

a light source, a condenser, and a field lens disposed serially along an optical axis, said condenser and said field lens being disposed so as to provide a light object curved surface between said light source and said condenser when a light image plane is disposed beyond said field lens, whereby every point in said light image plane is focused on said light object curved surface, and vice versa, said light source is a mercury arc lamp having an elongated mercury arc that is disposed on, and transversely to, said optical axis, an aperture stop is disposed between said condenser and said field lens, and every point in said light object curved surface is projected and magnified by the combination of both said condenser and said field lens onto said light image plane.

3. An optical system comprising:

a light source, a condenser, and a field lens disposed serially along an optical axis, said condenser and said field lens being disposed so as to provide a light object curved surface between said light source and said condenser when a light image plane is disposed beyond said field lens, whereby every point in said light image plane is focused on said light object curved surface, and vice versa, said light source is a mercury arc lamp that comprises a mercury arc enclosed within a transparent envelope, said light source, when energized, has a candle-power distribution curve that is opposite in curvature to that of said light object curved surface, and said light object curved surface, at said optical axis, is adjacent to, but slightly spaced from, said envelope.

* * * * *

UNITED STATES PATENT OFFICE
CERTIFICATE OF CORRECTION

Patent No. 3,860,335　　　　　　　　　Dated January 14, 1975

Inventor(s) Fausto Caprari

It is certified that error appears in the above-identified patent and that said Letters Patent are hereby corrected as shown below:

Column 1, line 11, "liht" should be --light--
Column 1, line 46, "ligh" should be --light--
Column 2, line 23, "enveolop" should be --envelope--
Column 4, line 14, "impage" should be --image--
Column 3, line 67, "are" should be --arc--
Column 4, line 65, "s" after "axis," should be omitted Signed and sealed this 18th day of March 1975.

(SEAL)
Attest:

RUTH C. MASON
Attesting Officer

C. MARSHALL DANN
Commissioner of Patents
and Trademarks